Dec. 30, 1930.  J. O. JOHNSON  1,786,848
WELL CAPPING DEVICE
Filed Jan. 7, 1929   2 Sheets-Sheet 1

Witness
H. Woodard

Inventor
J. O. Johnson

By H. B. Willson & Co.
Attorneys

Dec. 30, 1930. J. O. JOHNSON 1,786,848
WELL CAPPING DEVICE
Filed Jan. 7, 1929 2 Sheets-Sheet 2
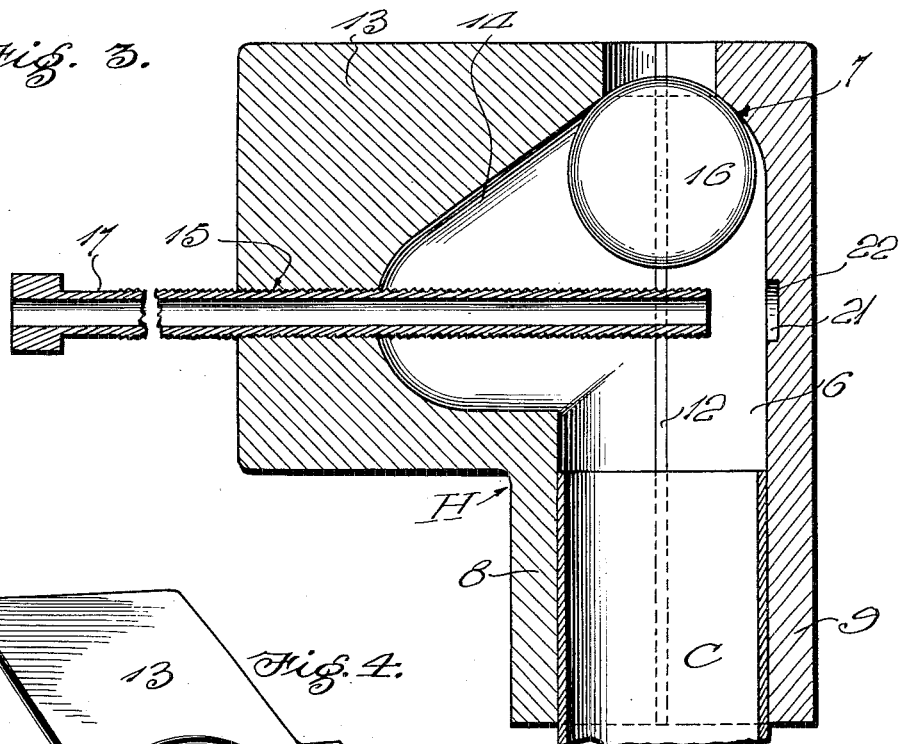
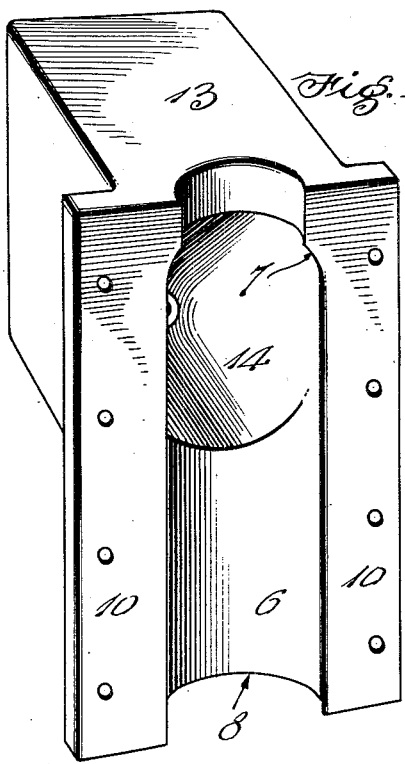
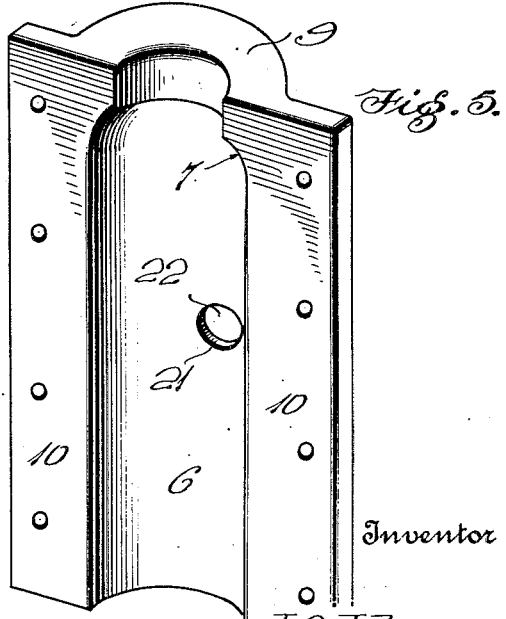

Patented Dec. 30, 1930

1,786,848

UNITED STATES PATENT OFFICE

JOSEPH O. JOHNSON, OF COALINGA, CALIFORNIA

WELL-CAPPING DEVICE

Application filed January 7, 1929. Serial No. 330,908.

The invention relates to improvements in devices for capping all sorts of flowing wells, whether oil, gas or water, and one object of the invention is to provide a construction in which a ball valve is gradually seated and held closed by the pressure discharging from the well casing, after said valve has been moved from a recess in which it is normally contained.
Another object of the invention is to provide combined means for forcing the ball valve out of the recess and for then preventing it from dropping down the well in case the pressure holding the valve seated should so diminish as to permit said valve to lower from its seat.

A still further aim is to provide the aforementioned thrust member in the form of a tube through which fluid may escape from the well after seating of the valve, and in this connection, a still further aim is to provide for the closing of this tube when it is desired to prevent the escape of fluid.

Yet another aim is to make novel provision for normally holding the ball valve in the recess so that it cannot become accidentally moved out of the same.

With the foregoing in view, the invention resides in the novel subject matter hereinafter described and claimed, the description being accomplished by reference to the accompanying drawings.

Fig. 3 is a vertical sectional view showing the ball valve seated and the tubular thrust member extended across the interior of the capping device under said valve.

Figure 1:
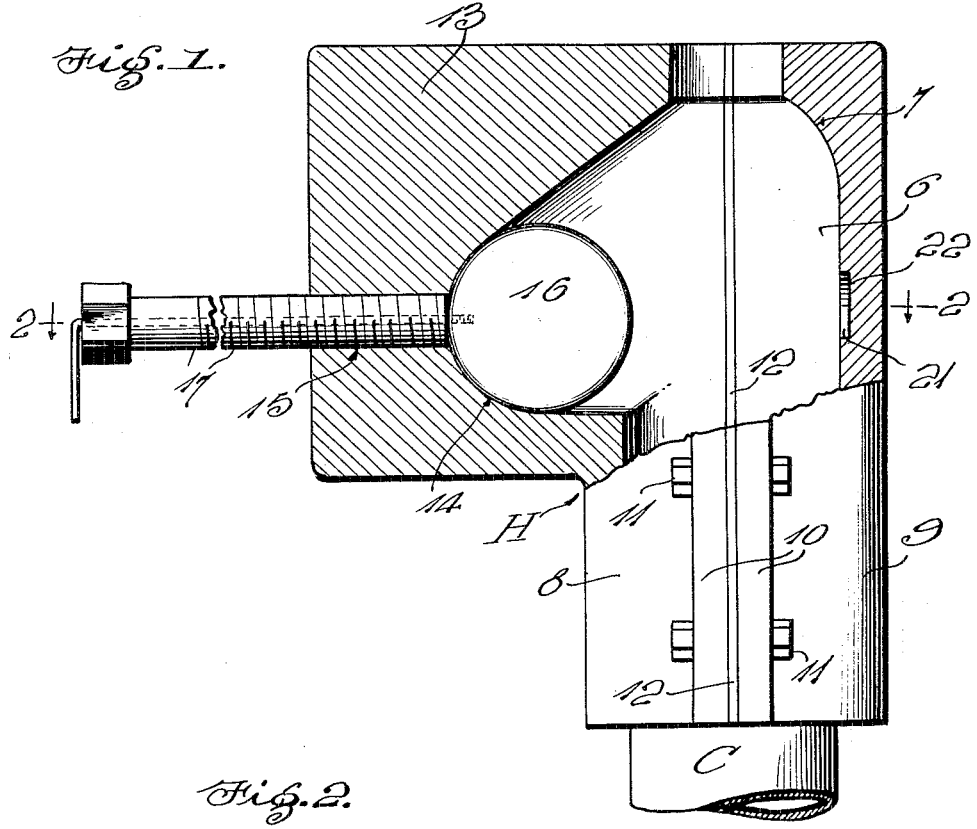
Fig. 1 is a side elevation partly in section showing the ball valve in its normal position.
Figure 2:
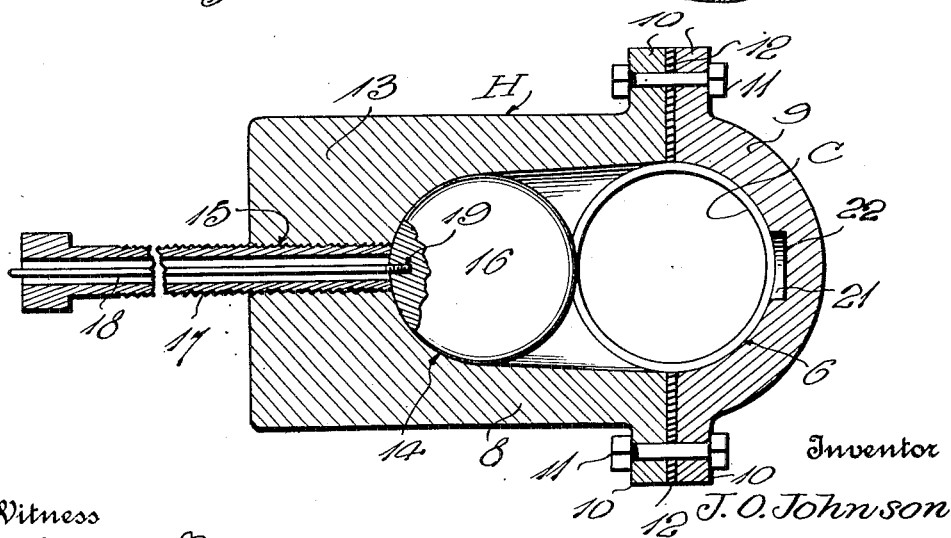
Fig. 2 is a horizontal sectional view on line 2—2 of Fig. 1.

Figs. 4 and 5 are perspective views of the two halves of the capping head which is applied to the well casing.
Within the scope of the invention as claimed, numerous variations may be made and in the present application, I have shown only one form of construction for illustrative purposes. Even though this construction will be herein specifically described, it is to be understood that by so doing, I do not limit myself to the exact disclosure.

A capping head H is shown for application to the upper end of a well casing C, said head having a passage 6 for communication with the casing and a downwardly facing valve seat 7 at the upper end of said passage. The member through which the passage 6 is formed may either be threaded upon the well casing C or may be constructed in such manner as to be clamped around the latter. In the present showing, the head H is formed of two sections 8—9 divided diametrically of the passage 6 and provided with outstanding flanges 10 which are bolted together as shown at 11, gaskets 12 of soft metal or other desired material being interposed between the two sections. Tightening of the bolts 11 not only secures these sections together, but clamps them tightly upon the casing C.

The section 8 is provided with a lateral enlargement 13 in which a recess 14 is formed, said recess communicating with the passage 6 below the valve seat 7, said recess preferably having a horizontal lower side, an inwardly inclined upper side and parallel vertical side walls. The enlargement 13 is also formed with an opening 15 leading from the inner end of the recess 14 to the exterior of said enlargement, said inner end of the recess being preferably of about hemispherical form.

A ball valve 16 is disposed normally within the recess 14, and a tubular thrust member 17 is threaded into the opening 15. A rod or the like 18 passes longitudinally through this thrust member 17 and is loosely threaded into a socket 19 in the ball 16, and the outer end 20 of this rod may well turn laterally at the outer end of the member 17, so that this rod normally holds the ball 19 against accidental displacement from the recess 14.

Upon upward discharge of fluid through the passage 6, the rod 18 may be unthreaded from the socket 19, thereby freeing the ball valve 16. Then, the tubular thrust member 17 is threaded further into the head H, with the result that it forces said ball valve out of the recess 14 into the path of the upwardly flowing fluid. This fluid engages the valve 16 with the seat 7 and such engagement takes place gradually so that there is no sudden shock imparted to the head or casing. After performing its office of forcing the valve 16 out of the recess 14, the member 17 is threaded still further inwardly until it extends across the interior of the passage 6 as shown in Fig. 3, in which position, it prevents dropping of the valve down the well, in case the pressure should so diminish as to permit unseating of said valve. In this same position, the member 17 acts to conduct fluid from the passage 6 and said member may be coupled in any desired way to a pipe line if it be desired to conduct such fluid to a tank, reservoir or the like. When it is desirable to prevent escape of fluid through the member 17, this member may be threaded still further inward until its inner end is closed by contact with the head section 9, the interior of this section being preferably recessed at 21 to receive the inner end of said member 17. The inner wall 22 of the recess is flat or otherwise shaped to tightly close the inner end of the member 17. This member, it will be observed, performs a multiple function. First, it inwardly forces the valve 16 from the recess 14, second, it underlies the seated valve and prevents it from dropping down a well in case decrease of pressure should permit it to disengage from the seat 7, third, it acts to conduct fluid from the passage 6, and fourth, it acts as a valve to prevent such discharge when desired.

On account of the excellent results obtainable from the general construction shown and described, such construction is preferably followed. Attention is again invited to the fact however, that within the scope of the invention as claimed, variations may be made.

I claim:—

1. A well capping device comprising a vertical passage member having a downwardly facing valve seat at its interior and a lateral internal recess below said seat, a ball valve normally disposed in said recess, and tubular means extending from the exterior to the interior of said passage member for forcing said ball valve out of said recess and for then conducting fluid from said passage member, said valve being co-operable with said seat.

2. A structure as specified in claim 1; said tubular means being mounted for movement across the interior of the passage member under the seated ball valve.

3. A well capping device comprising a vertical passage member having a downwardly facing valve seat at its interior and a lateral internal recess below said seat, said passage member being formed also with an opening from its exterior into said recess, the axis of said opening being transverse to said passage member, a ball valve normally in said recess, a tubular thrust member having one end normally positioned in said opening whereby said thrust member may be inwardly moved to force said valve from the recess into the path of fluid rising through said passage member, said valve being formed with a threaded socket disposed normally at the inner end of said thrust member, and a rod passing longitudinally through said thrust member and loosely threaded in said socket to hold the valve against accidental movement from said recess.

4. A well capping device comprising a vertical passage member having a downwardly facing seat at its interior and a lateral internal recess below said seat, said passage member being formed also with an opening from its exterior into said recess, the axis of said opening being transverse to said passage member, a ball valve normally in said recess, and a thrust member inwardly insertible through said opening to force said ball valve out of said recess, allowing upward fluid pressure to engage said valve with said seat, said thrust member being then movable across the interior of said passage member under the seated valve, said thrust member being tubular to conduct fluid from the passage member.

5. A structure as specified in claim 4; said passage member having an interior face against which the inner end of said tubular thrust member may be held to prevent discharge of liquid therethrough when desired.

In testimony whereof I have hereunto affixed my signature.

JOSEPH O. JOHNSON.